(12) United States Patent
Yang et al.

(10) Patent No.: US 7,492,613 B2
(45) Date of Patent: Feb. 17, 2009

(54) CONTROL CIRCUIT OF POWER CONVERTER HAVING ADAPTIVE BIAS FOR DETECTING REFLECTED VOLTAGE OF TRANSFORMER

(75) Inventors: Ta-yung Yang, Milpitas, CA (US); Chuh-Ching Li, Jhongli (TW); Feng Cheng Tsao, Linbian Township, Pingtung County (TW)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 11/288,726

(22) Filed: Nov. 28, 2005

(65) Prior Publication Data

US 2007/0133231 A1 Jun. 14, 2007

(51) Int. Cl.
*H02M 3/335* (2006.01)
(52) U.S. Cl. .................... 363/21.01; 363/21.16

(58) Field of Classification Search ........... 363/20, 363/21.01, 95, 97, 131, 21.12, 21.16, 21.17
See application file for complete search history.

(56) References Cited

U.S. PATENT DOCUMENTS

| 4,302,803 | A | | 11/1981 | Shelly | ......................... 363/20 |
| 4,868,729 | A | * | 9/1989 | Suzuki | ..................... 363/21.15 |
| 6,229,739 | B1 | * | 5/2001 | Poplevine et al. | ...... 365/189.09 |
| 6,977,824 | B1 | * | 12/2005 | Yang et al. | ................ 363/21.16 |
| 2003/0132738 | A1 | * | 7/2003 | Balakrishnan et al. | ....... 323/282 |

\* cited by examiner

*Primary Examiner*—Akm E Ullah
*Assistant Examiner*—M'baye Diao
(74) *Attorney, Agent, or Firm*—J.C. Patents

(57) ABSTRACT

A control circuit for detecting the reflected voltage of a transformer is provided. A detection circuit is developed for sampling the reflected voltage. Because the pulse width of the reflected voltage is narrower at light load, a bias circuit is utilized for producing a bias signal to help the reflected voltage detection. Furthermore, a blanking circuit ensures a minimum pulse width of the reflected voltage.

6 Claims, 5 Drawing Sheets

CONTROL CIRCUIT OF POWER CONVERTER HAVING ADAPTIVE BIAS FOR DETECTING REFLECTED VOLTAGE OF TRANSFORMER

BACKGROUND OF THE INVENTION

1. Field of the Invention

The present invention relates to a power converter, and more specifically relates to a switching power converter.

2. Description of Related Art

Power converters have been widely used for providing regulated outputs. For safety, the power converter must provide galvanic isolation between its primary side and secondary side. A transformer is usually equipped for providing the isolation and energy transfer. FIG. 1 shows a traditional power converter having a transformer 10. The energy is stored inside the transformer 10 when a switch 20 is turned on. The energy shall be discharged to the output of the power converter when the switch 20 is turned off. A resistor 21 is connected in series with the switch 20 for sensing the switching current of the transformer 10 and for generating a current signal $V_S$ for the switching control. A controller 25 is coupled to the transformer 10 and the resistor 21 for generating a control signal $V_G$ to control the on/off of the switch 20 and to regulate the output of the power converter. The transformer 10 includes a primary winding $N_P$, a secondary winding $N_S$, and an auxiliary winding $N_A$. Once the switch 20 is turned off, the auxiliary winding $N_A$ shall generate a reflected voltage $V_F$ correlated to the output voltage $V_O$. Therefore, the reflected voltage $V_F$ can be utilized to feedback the output voltage $V_O$. A reflected voltage control technique has been disclosed in U.S. Pat. No. 4,302,803 "Rectifier-Converter Power Supply with Multi-Channel Flyback Inverter". However, the disadvantage of the aforementioned reference is that the reflected voltage cannot be accurately measured, particularly at the light load condition.

FIG. 2 shows a plurality of voltage waveforms of the power converter at the light load. The discharge time $T_{DS}$ of the transformer 10 is given by:

$$T_{DS} = \left(\frac{V_{IN}}{V_O + V_D}\right) \times \frac{W_{NS}}{W_{NP}} \times T_{ON} \quad (1)$$

where $V_{IN}$ is the input voltage of the power converter, $W_{NP}$ and $W_{NS}$ respectively are the winding turns of the primary winding $N_P$ and the secondary winding $N_S$ of the transformer 10, $V_D$ is a forward voltage drop of the rectifier 15, and $T_{ON}$ is an on-time of the control signal $V_G$. The reflected voltage $V_F$ is connected to the controller 25 through a resistor 22 in FIG. 1. A voltage $V_{DET}$ is therefore produced in the controller 25 for the reflected voltage detection. However, a parasitic capacitor 23 and the resistor 22 cause a low pass filtering to the reflected voltage $V_F$. Apart from the fact that the on-time $T_{ON}$ of the control signal $V_G$ and the discharge time $T_{DS}$ of the reflected voltage $V_F$ are short at light load, the waveform distortion of the voltage $V_{DET}$ is shown in FIG. 2. A lower reflected voltage is therefore detected. The main objective of the present invention is for overcoming the aforementioned drawback.

SUMMARY OF THE INVENTION

A control circuit is developed for detecting the reflected voltage of a transformer and regulating the power converter. It includes a switch and a controller, in which the switch is coupled to switch the transformer and to transfer the energy from the primary side to the secondary side of the transformer. The controller includes a detection circuit, a switching circuit, and an adjust circuit. The detection circuit is coupled to the transformer for detecting the reflected voltage of the transformer and for generating a feedback signal in accordance with the reflected voltage. The switching circuit is used for generating a control signal to control the switch and to regulate the output of the power converter in response to the feedback signal. The feedback signal is further used by the adjust circuit for generating an adjust signal. The detection circuit includes a bias circuit to generate a bias signal coupled to the input of the detection circuit for helping the reflected voltage detection and for preventing the waveform distortion. The bias signal is produced proportionally to the adjust signal. Besides the switching circuit, a blanking circuit is used for generating a blanking signal in response to the control signal. The blanking signal ensures a minimum on time of the control signal once the control signal is switched on. The minimum on time of the control signal produces a minimum pulse width of the reflected voltage, which further facilitates the reflected voltage detection.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DESCRIPTION OF THE EMBODIMENTS

Figure 1:
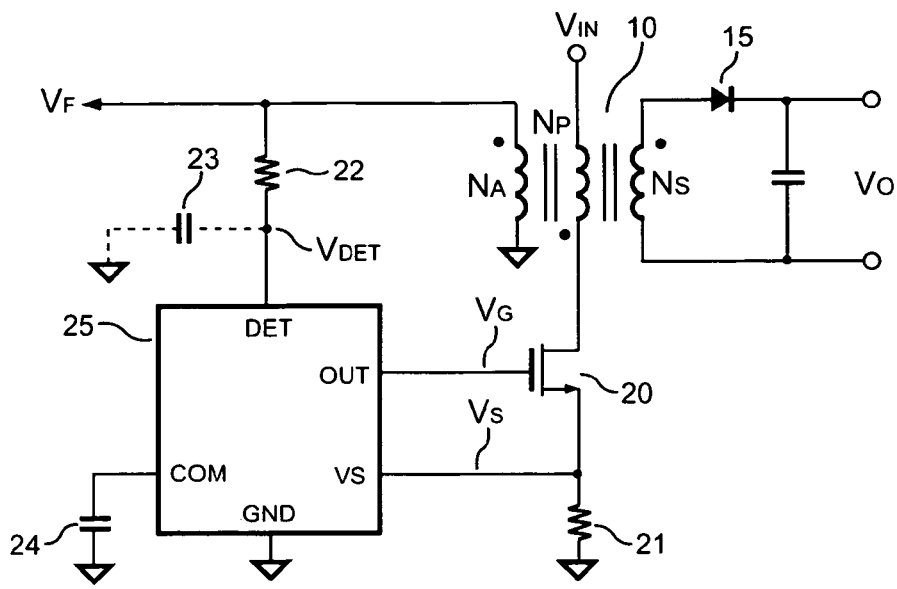
FIG. 1 shows a circuit schematic of a traditional power converter.
Figure 3:
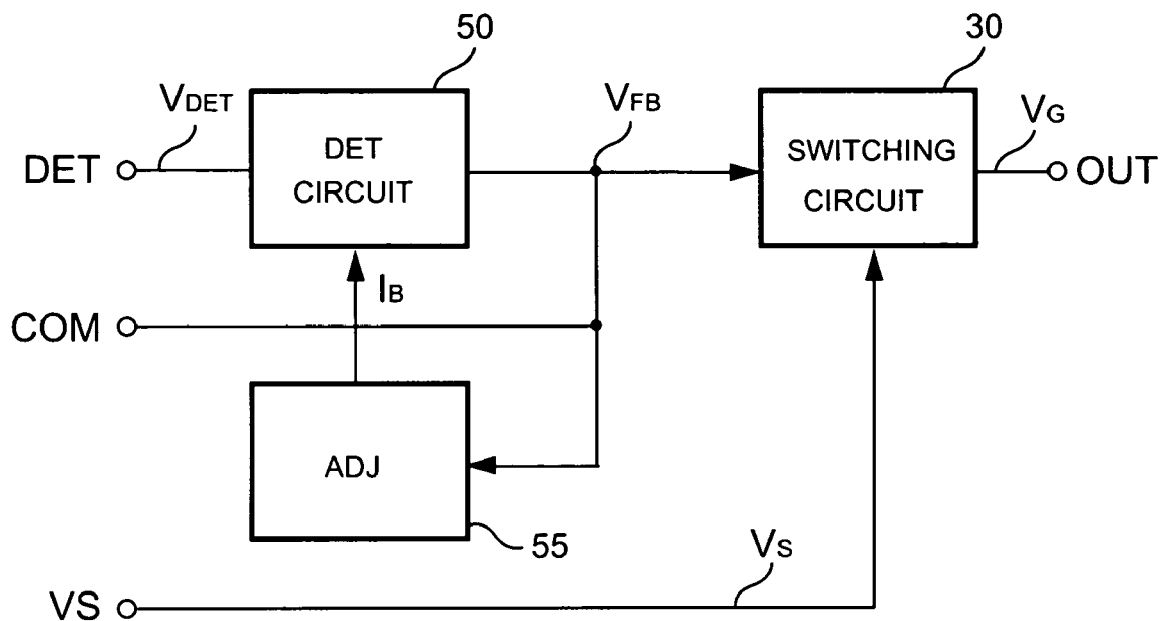
FIG. 3 shows a block schematic of the controller according to the present invention.

The control circuit of the power converter includes a switch 20 and a controller 25. The controller 25 generates a control signal $V_G$ to control the switch for switching the transformer 10. FIG. 3 shows a block schematic of the controller 25 according to the present invention. The controller 25 includes a switching circuit 30, a detection circuit 50, and an adjust circuit 55. Referring to FIG. 1, the detection circuit 50 is coupled to a transformer 10 for detecting the reflected voltage $V_F$ of the transformer 10 and generating a feedback signal $V_{FB}$ in accordance with the reflected voltage $V_F$. The switching circuit 30 generates a control signal $V_G$ at the output terminal of the controller 25 for controlling the switch 20 and regulating the output of the power converter in response to the feedback signal $V_{FB}$. The feedback signal $V_{FB}$ is further used by the adjust circuit 55 for generating an adjust signal $I_B$.

Figure 4:
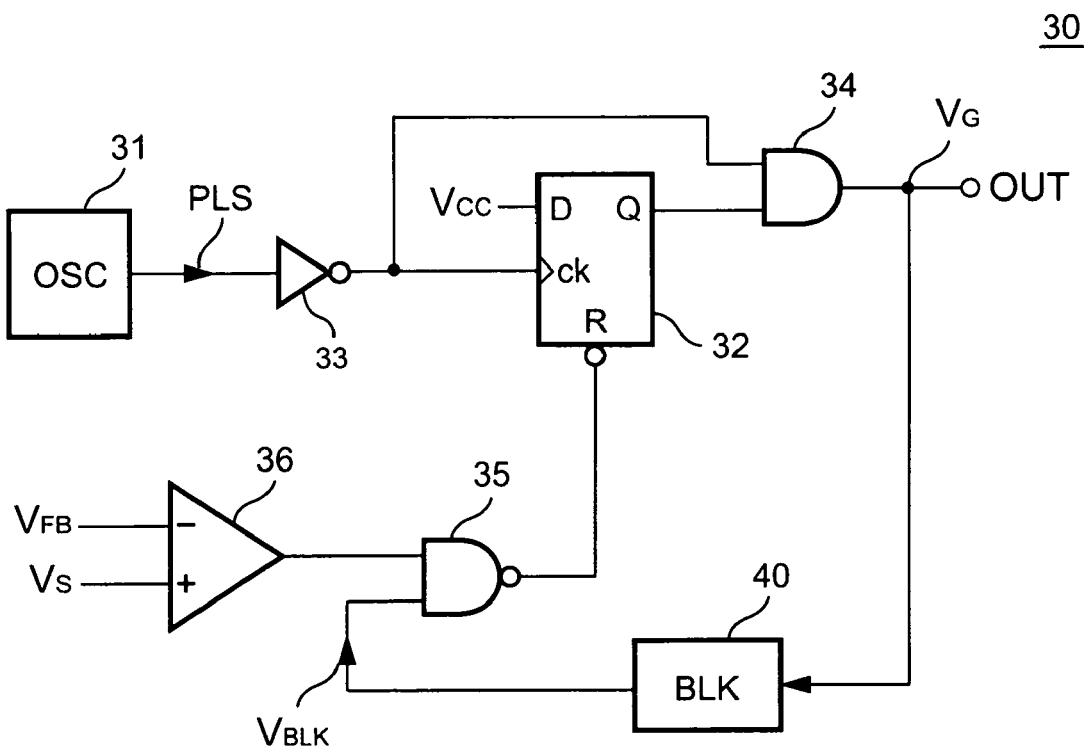
FIG. 4 shows the circuit schematic of a switching circuit according to the present invention.

The switching circuit 30 is shown in FIG. 4, in which an oscillation circuit 31 is utilized for producing a periodic pulse signal PLS. The pulse signal PLS is coupled to a flip-flop 32 for enabling the control signal $V_G$. The output of the flip-flop 32 is connected to the input of an AND gate 34. Through an inverter 33, another input of the AND gate 34 is coupled to the pulse signal PLS for providing a maximum on time for the control signal $V_G$. The output of the AND gate 34 produces the control signal $V_G$ connected to the output terminal OUT of the controller 25. A comparator 36 is utilized for disabling the flip-flop 32 once the current signal $V_S$ is higher than the feedback signal $V_{FB}$. The output of the comparator 36 is connected to the input of an AND gate 35. Another input of the AND gate 35 is connected from the output of a blanking circuit 40. The input of the blanking circuit 40 is supplied by the control signal $V_G$. The output of the AND gate 35 is connected to reset the flip-flop 32.

Figure 2:
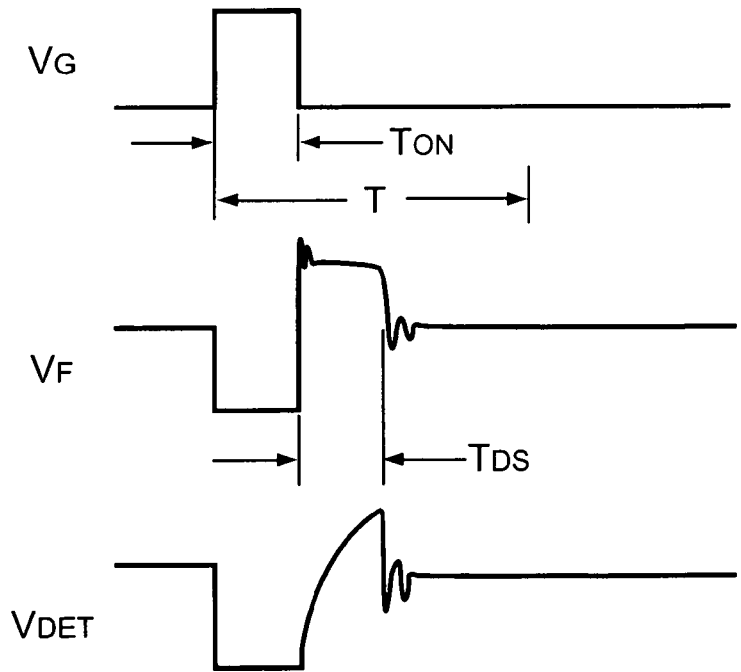
FIG. 2 shows a plurality of voltage waveforms of the traditional power converter at the light load.
Figure 5:
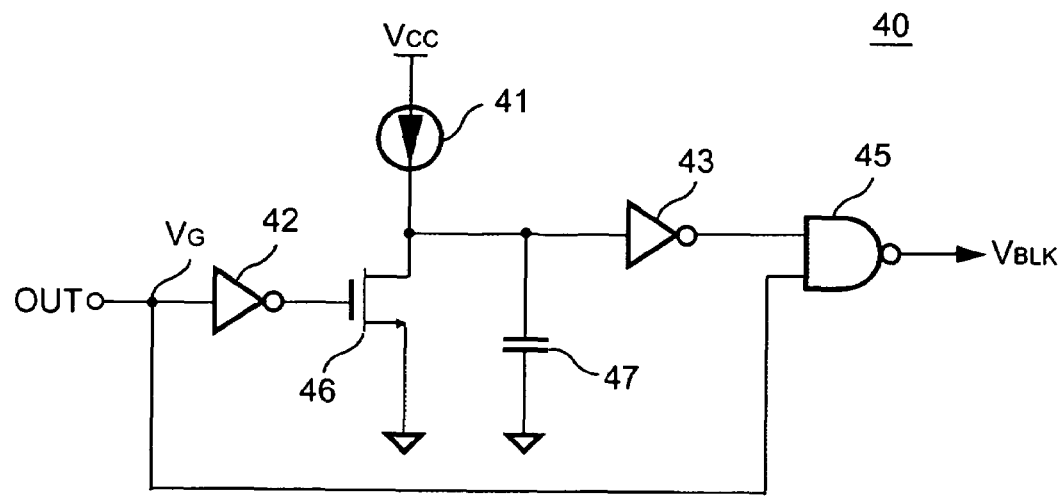
FIG. 5 shows the circuit schematic of a blanking circuit according to the present invention.

The blanking circuit 40 according to the present invention is shown in FIG. 5. Through an inverter 42, the control signal $V_G$ is coupled to turn off a transistor 46 when the control signal $V_G$ is enabled. A current source 41 shall start to charge a capacitor 47 once the transistor 46 is in an off-state. The capacitor 47 is further connected to a NAND gate 45 via an inverter 43. Another input of the NAND gate 45 is connected to the control signal $V_G$. The output of the NAND gate 45 therefore generates the blanking signal $V_{BLK}$ in response to the enabling of the control signal $V_G$. The current of the current source 41 and the capacitance of the capacitor 47 determine the pulse width of the blanking signal $V_{BLK}$. The blanking signal $V_{BLK}$ ensures a minimum on time of the control signal $V_G$ once the control signal $V_G$ is switched on. Referring to FIG. 1 and FIG. 2, the minimum on time of the control signal $V_G$ further produces a minimum pulse width of the reflected voltage $V_F$, which facilitates the reflected voltage detection.

Figure 6:
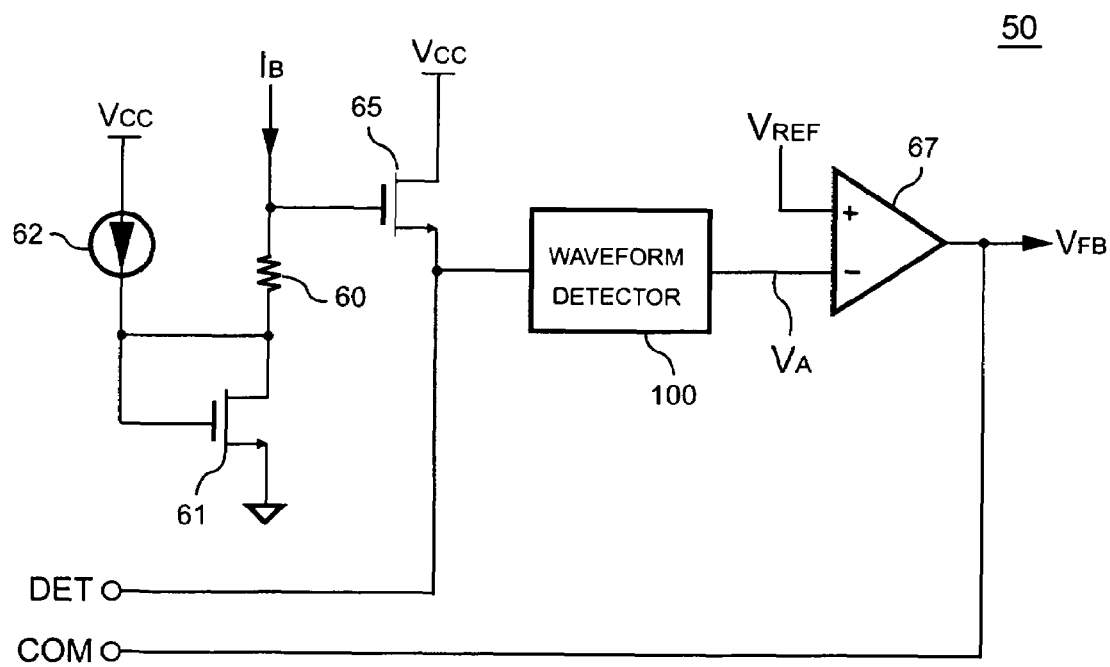
FIG. 6 shows the detection circuit according to an embodiment of the present invention.

FIG. 6 shows the detection circuit 50 according to an embodiment of the present invention. The detection circuit 50 includes an error amplifier 67, a waveform detector 100, and a bias circuit. Referring to FIG. 3, the bias circuit generates a bias signal $V_B$ added to the input terminal DET of the detection circuit 50 for helping the reflected voltage detection and preventing the waveform distortion of the voltage $V_{DET}$. The bias signal $V_B$ is produced proportionally to the adjust signal $I_B$. The bias circuit includes a transistor 65 having a source terminal coupled to the input terminal DET of the detection circuit 50 for generating the bias signal $V_B$. A resistor 60 is coupled to receive the adjust signal $I_B$ for generating a bias voltage at the gate terminal of the transistor 65. Therefore, the bias signal $V_B$ is generated proportionally to the bias voltage. To compensate the gate-to-source voltage of the transistor 65, a transistor 61 is connected in series with the resistor 60. The gate terminal and the drain terminal of the transistor 61 are connected to the resistor 60. The source terminal of the transistor 61 is connected to ground. A current source 62 is further connected to bias the transistor 61.

To detect the reflected voltage $V_F$, the waveform detector 100 is coupled to the DET terminal to sense the reflected voltage $V_F$ and to generate a sampled signal $V_A$ in accordance with the reflected voltage $V_F$. The error amplifier 67 having a reference signal $V_{REF}$ generates the feedback signal $V_{FB}$ in response to the sampled signal $V_A$. The error amplifier 67 is a trans-conductance amplifier. The output of the error amplifier 67 is coupled to the COM terminal of the controller 25. Referring to FIG. 1, a capacitor 24 is connected to the COM terminal to provide frequency compensation for the error amplifier 67.

Figure 7:
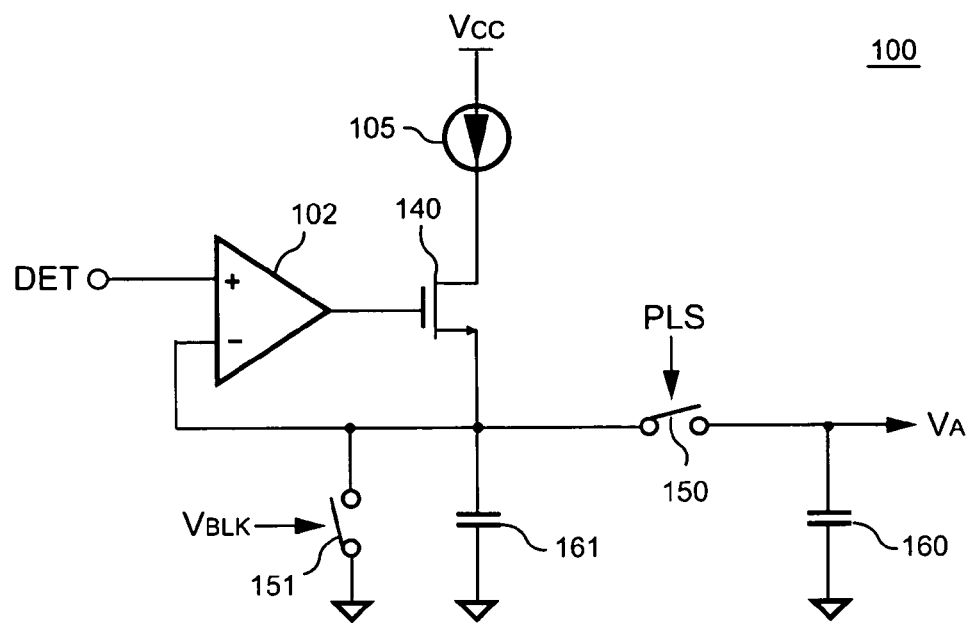
FIG. 7 shows a circuit schematic of the waveform detector according to an embodiment of the present invention.

FIG. 7 shows a circuit schematic of the waveform detector 100 according to the present invention. A transistor 140 has a drain terminal connected to a current source 105. An amplifier 102 has a positive input connected to the input terminal DET of the detection circuit 50 for the detection of the reflected voltage $V_F$. The output of the amplifier 102 is coupled to the gate terminal of the transistor 140. The negative input of the amplifier 102 is connected to the source terminal of the transistor 140. A capacitor 161 is connected to the source terminal of the transistor 140. A switch 151 is parallel connected with the capacitor 161 for discharging the capacitor 161 periodically. A capacitor 160 is used for generating the sampled signal $V_A$ in accordance with the reflected voltage $V_F$. A switch 150 controlled by the pulse signal PLS periodically samples the signal from the capacitor 161 to the capacitor 160 to hold the sampled signal $V_A$ on the capacitor 160.

Figure 8:
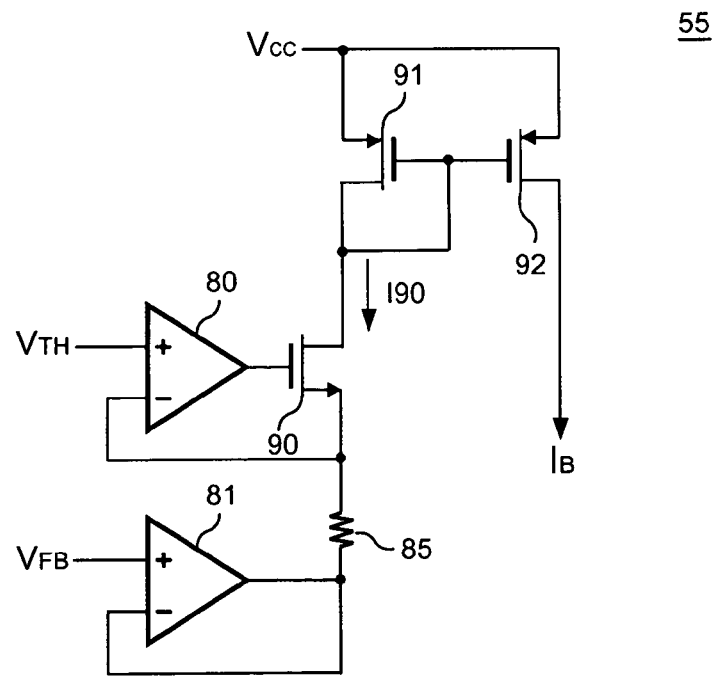
FIG. 8 shows the circuit schematic of the adjust circuit according to the present invention.

FIG. 8 shows the circuit schematic of the adjust circuit 55. An amplifier 80 has a positive input supplied by a threshold voltage $V_{TH}$. An amplifier 81 has a positive input connected to the feedback signal $V_{FB}$. The negative input of the amplifier 81 is connected to the output of the amplifier 81 for building a buffer. A transistor 90 is coupled to the output of the amplifier 80 for generating a current 190 in response to the threshold voltage $V_{TH}$ and the feedback voltage $V_{FB}$. A resistor 85 is connected from the transistor 90 to the output of the amplifier 81. A transistor 91 and a transistor 92 form a current mirror to generate the adjust signal $I_B$ in accordance with the current I90. The adjust signal $I_B$ is therefore generated in accordance with the feedback signal $V_{FB}$, which the feedback signal $V_{FB}$ has produced in response to the reflected voltage $V_F$.

Figure 9:
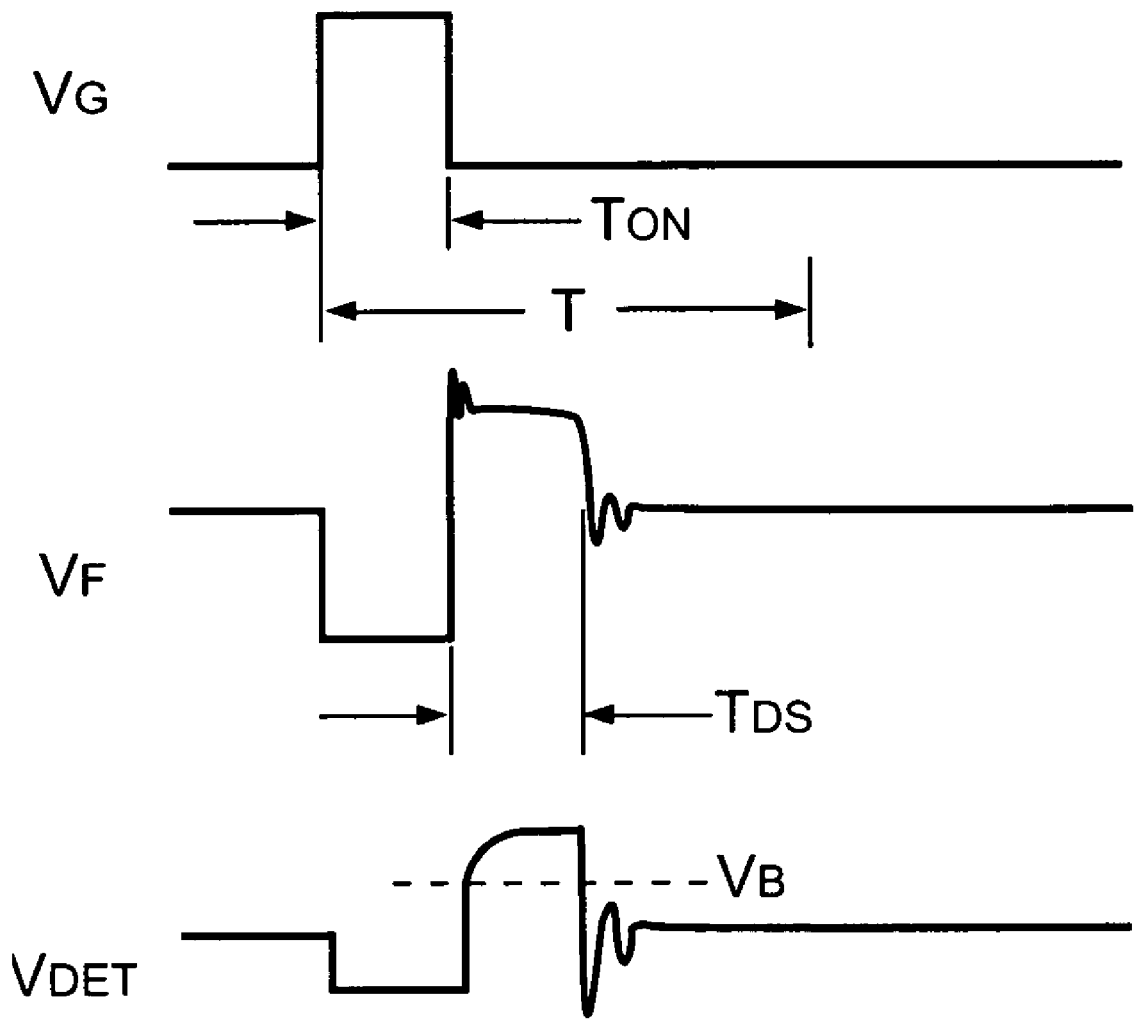
FIG. 9 shows a plurality of voltage waveforms of the power converter at the light load according to the present invention.

FIG. 9 shows a plurality of voltage waveforms of the power converter at the light load according to the present invention, in which the bias signal $V_B$ is added to the input terminal DET. The voltage $V_{DET}$ can be expressed as:

$$V_{DET} = V_F \times \left(1 - e^{\frac{-t}{R \times C}}\right) + V_B \qquad (2)$$

$$t = R \times C \times \ln\left(\frac{V_F}{V_F - V_{DET} + V_B}\right) \qquad (3)$$

where R is the resistance of the resistor 22, C is the capacitance of the parasitic capacitor 23, and t is the period for the voltage $V_{DET}$ charged up to the reflected voltage $V_F$. By adding the bias signal $V_B$, the rising time of the voltage $V_{DET}$ can be dramatically reduced. Therefore, the reflected voltage $V_F$ can be properly detected.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A control circuit of a power converter, comprising:

a switch coupled to a transformer for switching the transformer;

a detection circuit coupled to the transformer for detecting a reflected voltage of the transformer and generating a feedback signal in accordance with the reflected voltage;

a switching circuit generating a control signal to control the switch and to regulate the output of the power converter in response to the feedback signal; and an adjust circuit generating an adjust signal proportionally to the feedback signal, wherein the detection circuit includes a bias circuit for receiving the adjust signal and generating a bias signal proportionally to the adjust signal, the bias signal is coupled to the input of the detection circuit for the detection of the reflected voltage.

2. The control circuit of the power converter as claimed in claim 1, wherein the switching circuit comprises a blanking circuit for generating a blanking signal in response to the control signal, in which the blanking signal ensures a minimum on time of the control signal once the control signal is switched on.

3. The control circuit of the power converter as claimed in claim 1, the bias circuit comprising:
   a transistor coupled to the input of the detection circuit for generating the bias signal; and
   a resistor coupled to receive the adjust signal for generating a bias voltage to control the transistor,
   wherein the bias signal is generated proportionally to the bias voltage.

4. The control circuit of the power converter as claimed in claim 1, the detection circuit further comprising:
   a waveform detector for detecting the reflected voltage and generating a sampled signal in accordance with the reflected voltage; and
   an error amplifier having a reference signal for generating a feedback signal in response to the sampled signal.

5. The control circuit of the power converter as claimed in claim 4, the waveform detector comprising a current source;

a buffer transistor having a first terminal connected to the current source;

an amplifier having a positive input connected to the input of the detection circuit for detecting the reflected voltage; the output of the amplifier coupled to control the second terminal of the buffer transistor; the negative input of the amplifier connected to a third terminal of the buffer transistor;

a first capacitor connected to the third terminal of the buffer transistor, a first switch connected in parallel with the first capacitor for discharging the first capacitor periodically;

a second capacitor generating the sampled signal in accordance with the reflected voltage; and a second switch periodically sampling the signal of the first capacitor and storing into the second capacitor.

6. The control circuit of the power converter as claimed in claim 1, the adjust circuit comprising:
   a first amplifier having a positive input supplied by a threshold voltage;
   a second amplifier having a positive input connected to the feedback signal, and the negative input of the second amplifier connected to the output of the second amplifier;
   a first transistor coupled to the output of the first amplifier for generating a first transistor current in response to the threshold voltage and the feedback voltage;
   a first resistor connected from the first transistor to the output of the second amplifier; and
   a second transistor and a third transistor forming a current mirror for generating the adjust signal in accordance with the first transistor current.

* * * * *